United States Patent [19]

Mears

[11] Patent Number: 4,679,882
[45] Date of Patent: Jul. 14, 1987

[54] SUPPORT CLIPS FOR SUPPORTING ELECTRICAL FIXTURES IN A JUNCTION BOX

[76] Inventor: Larry E. Mears, P.O. Box 6548, Lake Worth, Fla. 33461

[21] Appl. No.: 777,055

[22] Filed: Sep. 17, 1985

[51] Int. Cl.⁴ .............................................. H02B 1/02
[52] U.S. Cl. .................................. 439/569; 220/3.9; 439/535; 439/538
[58] Field of Search ................. 339/14, 132 R, 133 R, 339/122 R, 122 F, 123; 220/3.3, 3.8, 3.9; 174/53.05

[56] References Cited

U.S. PATENT DOCUMENTS

| | | |
|---|---|---|
| 1,263,177 | 4/1918 | Wever . |
| 1,604,237 | 10/1926 | Platt .................................. 174/53 X |
| 1,784,885 | 12/1930 | Wolarsky . |
| 1,933,358 | 10/1933 | Almcrantz . |
| 2,480,805 | 8/1949 | Buckels . |
| 2,934,590 | 4/1960 | Thompson et al. . |
| 3,437,737 | 4/1969 | Wagner . |
| 3,437,738 | 4/1969 | Wagner . |
| 3,514,063 | 5/1970 | Hollander . |
| 3,617,611 | 11/1971 | Kuether ..................... 339/14 R X |
| 3,651,245 | 3/1972 | Moll . |
| 3,697,924 | 10/1972 | Oliver . |
| 3,955,701 | 5/1976 | Fisch . |
| 4,059,328 | 11/1977 | Rigo . |
| 4,062,512 | 12/1977 | Arnold . |
| 4,124,267 | 11/1978 | Mines et al. . |

Primary Examiner—Eugene F. Desmond
Attorney, Agent, or Firm—Jones, Tullar & Cooper

[57] ABSTRACT

Support clips for supporting the mounting brackets of an electrical fixture in a junction box are disclosed. The clips are formed from a single piece of sheet material and are adapted at one end to be crimped between the junction box and the junction box cover, and at the other end to engage and support the mounting brackets disposed on the ends of the fixture. In the case where the electrical fixture is a duplex receptacle, the clips serve to prevent the pivoting of the receptacle about a single center mounting screw during insertion of a plug into one of the receptacle outlets, and thereby prevent the mounting screw from loosening after repeated usage of the receptacle.

12 Claims, 15 Drawing Figures

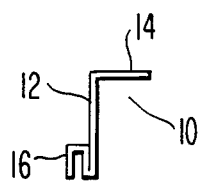
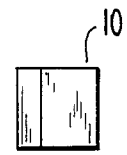
FIG.1a  FIG.1b
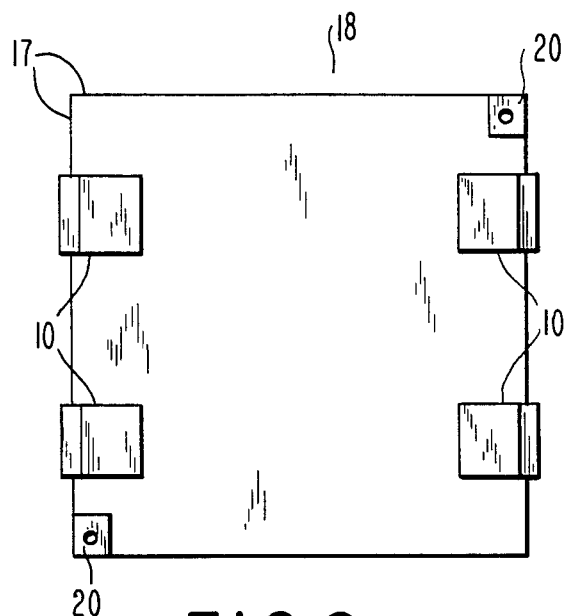
FIG.2a
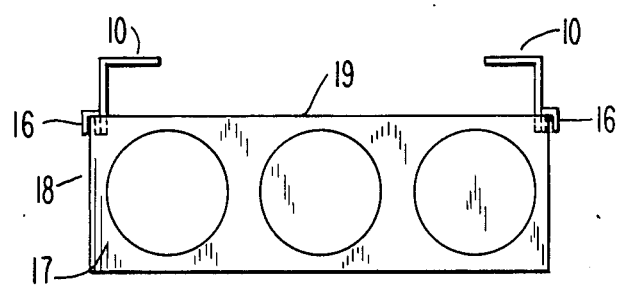
FIG.2b

SUPPORT CLIPS FOR SUPPORTING ELECTRICAL FIXTURES IN A JUNCTION BOX

BACKGROUND OF THE INVENTION

The present invention relates to support clips for use in supporting electrical fixtures, such as duplex receptacles, in a junction box of the type having a generally cup shaped cover.

When it is desired to dispose one or more duplex outlet receptacles in the cover of a standard junction box, the only means provided for supporting the receptacles, are single screws which pass through holes in the center of the box cover, and into a threaded opening in the center of each receptacle. A problem with this mounting arrangement is that the receptacle tends to pivot about the mounting screw every time an electrical plug is inserted into one of the outlets. Not only does this make it somewhat difficult to quickly insert the plug tightly into the outlet, but after repeated insertions, the receptacle works loose, and may break unless the mounting screw is retightened. Up until now, no simple solution to this problem has been devised.

SUMMARY OF THE INVENTION

It is therefore the object of the present invention to provide a simple, inexpensive means by which an electrical fixture can be more securely supported in a standard junction box.

It is another object of the present invention to provide a means by which an electrical fixture may be more securely supported in a junction box, and which does not require any modification or retooling of the junction box components.

Briefly, the present invention comprises a plurality of support clips which are fashioned from any suitable material such as sheet metal, and are formed in such a manner that they can be attached either to the junction box base or cover, or to the receptacle mounting brackets which are normally utilized to mount the receptacle in a wall mounted electrical box. When the junction box cover having the receptacle attached thereto is secured to the base, the support clips act to support the mounting brackets at each end of the receptacle, and thereby act to prevent the receptacle from pivoting about the center mounting screw during insertion of a plug into one of the outlets.

Specifically, in a first embodiment of the invention, the support clips are generally of an inverted "L" shaped configuration, and include a vertical leg, a horizontal leg, and a "U" shaped flange formed at the lower end of the vertical leg. When the junction box cover is positioned on the box, the vertical leg of the clip extends up inside the cover and the horizontal leg of the clip bears against and supports the bottom surfaces of one of the receptacle mounting brackets. The "U" shaped flange engages the top edge of one of the box walls, and when the box cover is secured to the box, the clips are held firmly in place, and no additional attaching devices are necessary.

In a second embodiment of the invention, the generally inverted "L" shaped clips are shaped to be attached to the junction box cover with a "L" shaped flange portion at the lower end of the vertical leg of the clip. As with the first embodiment, these clips are securely held in place by the force exerted between the cover and the box when the cover is attached thereto.

In yet another embodiment of the invention, the clips are of a stepped configuration and are to be attached to the receptacle mounting brackets through the use of two downwardly extending extensions, one on each side of the horizontal legs of the clips. These clips further include a smaller "L" shaped section at the lower end of the vertical leg, the horizontal portion of which to bears against the top edge of one of the box walls when the cover is secured to the box.

All of the foregoing clips, therefore, provide support to the receptacle mounting brackets when the junction box cover is attached to the junction box, and prevent the receptacle from pivoting about the center mounting screw during insertion of a plug into one of the receptacle outlets. Thus these clips help prevent the center mounting screw from working loose after repeated usage of the receptacle.

BRIEF DESCRIPTION OF THE DRAWINGS

The foregoing objects, features, and advantages of the present invention will become apparent from a consideration of the following detailed description of preferred embodiments thereof taken in conjunction with the accompanying drawings, in which:

FIGS. 1a and 1b are side elevation and top plan views, respectively, of a first support clip of a first embodiment of the present invention;

FIGS. 2a and 2b are top plan and side elevation views, respectively; of a plurality of the first support clips in position on a conventional electrical junction box, with the clips being shown partially in phantom in FIG. 2b.

DESCRIPTION OF PREFERRED EMBODIMENTS

Figure 3A:
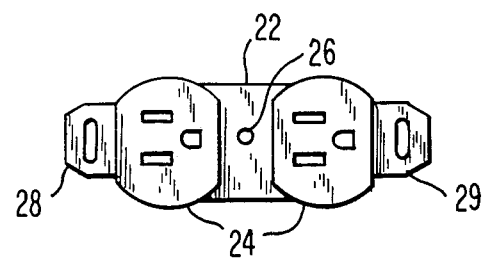
FIGS. 3a and 3b are top plan and side elevation views, respectively, of a conventional duplex receptacle.

Turning now to a more detailed consideration of the preferred embodiments of the present invention, there is illustrated in FIGS. 1a and 1b, a support clip 10 of a first embodiment of the invention, which is formed from any suitable sheet material, such as metal. Clip 10 is generally "L" shaped in configuration, and includes a vertical leg 12 having a lower end and an upper end, and a horizontal leg 14 extending from the upper end of vertical leg 12. A "U" shaped flange 16 is formed at the lower end of leg 12, and is utilized to secure the clip to the top edge of a wall of a junction box. The "U" shaped flange 16 is of a length, width, and thickness that enables clip 10 to be positioned relatively securely on the edge of a junction box wall without adhesive or fasteners. FIGS. 2a and 2b show four of these clips 10 positioned on the walls 17 of a junction box 18 for supporting the mounting brackets (to be described) on a pair of duplex receptacles. As illustrated in FIG. 2b, flanges 16 of clips 10, rest on the edges 19 of box walls 17. Box 18 includes two threaded apertured tabs 20 for receiving the mounting screws for the box cover (to be described).

Figure 3B:
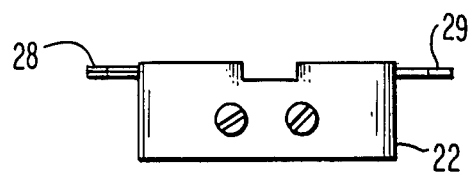

In FIGS. 3a and 3b, there is illustrated a conventional duplex receptacle 22 having a pair of outlets 24, a threaded aperture 26 in the center of the top thereof, and a pair of mounting brackets 28 and 29 at each end thereof.

Figure 4:
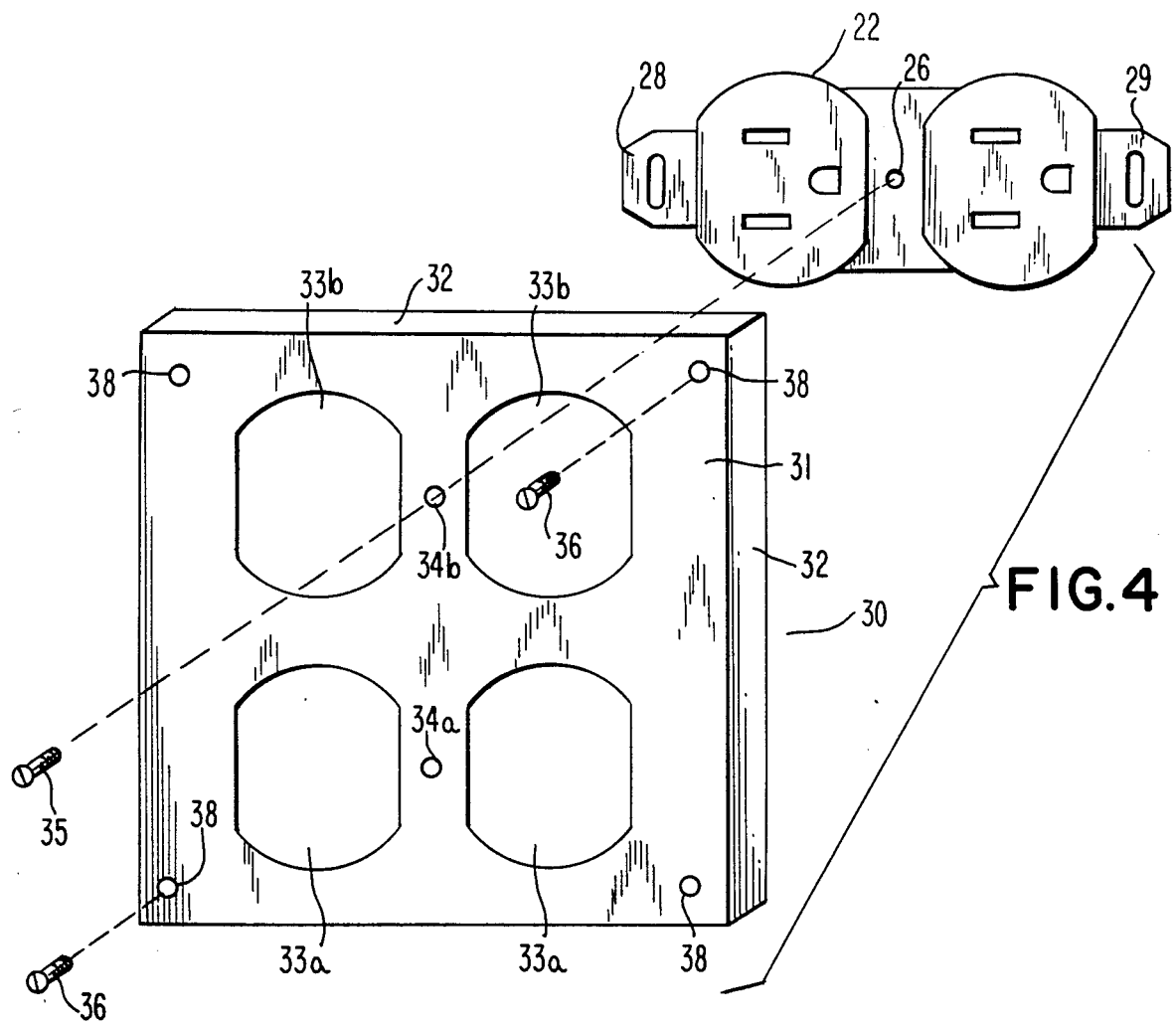
FIG. 4 is an exploded perspective diagram of the mounting of a duplex receptacle in a junction box cover.

In FIG. 4 there is illustrated a generally cup shaped junction box cover 30 having a flat top surface 31 and four depending walls 32. Two pairs of outlet openings 33a and 33b are formed in top surface 31 to receive the outlets of two pairs of duplex receptacles. In addition, a pair of apertures 34a and 34b is disposed in top surface 31 between each pair of outlet openings for reception of a receptacle mounting screw 35. Finally, four apertures 38 are disposed at the corners of top surface 31 to receive cover mounting screws 36 for mounting the cover 30 to the junction box 18.

As illustrated in FIG. 4, to mount a duplex receptacle in the box cover 30, a single screw 35 is utilized which is inserted through one of the apertures 34a or 34b, and is threaded into aperture 26 in the receptacle. Mounting brackets 28 and 29 are not utilized for mounting the receptacle since there are generally no mounting tabs in conventional junction boxes to secure the brackets to. Once a pair of receptacles have been attached to cover 30, the cover is secured to box 18 with cover mounting screws 36 that are inserted through two of the four apertures 38 in cover 30, and are threaded into tabs 20 of box 18.

Figure 5:
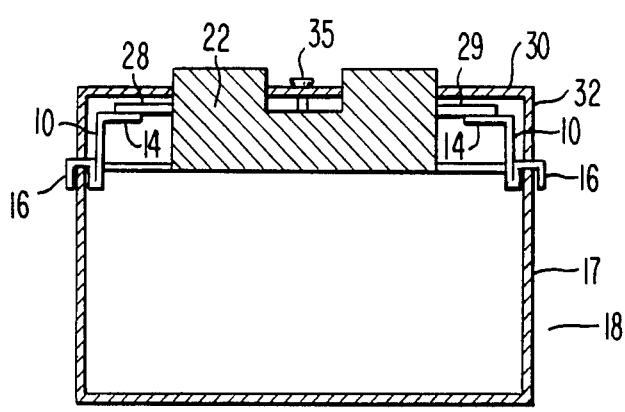
FIG. 5 is a sectional view of an assembled junction box and cover incorporating a duplex receptacle and the support clips of the first embodiment of the invention.

As illustrated in FIG. 5, when cover 30 is in position over box 18, clips 10 are securely held in position by the crimping action on "U" shaped flange 16 between cover 30 and box 18, and horizontal legs 14 of clips 10 bear against and support receptacle mounting brackets 28. In this manner, support clips 10 prevent receptacle 22 from pivoting about mounting screw 32 during insertion of a plug into one of the receptacle outlets.

Figure 6A:
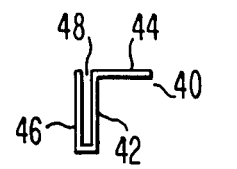
FIGS. 6a and 6b are side elevation and top plan views, respectively, of a second support clip of a second embodiment of the present invention.
Figure 6B:

Turning now to FIGS. 6a and 6b, there is illustrated a second support clip 40 of a second embodiment of the present invention. This clip is also generally inverted "L" shaped, and includes a vertical leg 42 having a lower end and an upper end, and a horizontal leg 44 extending from the upper end of vertical leg 42. Formed at the lower end of vertical leg 42, is a generally "L" shaped extension 46, which cooperates with leg 42 form a "U" shaped flange having a narrow slot 48.

Figure 7:
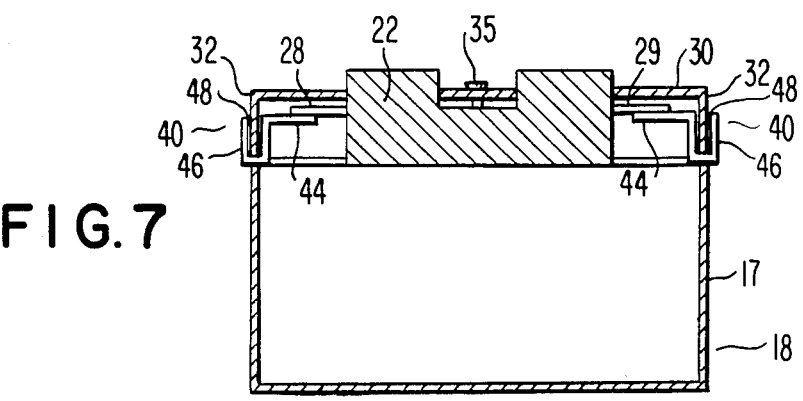
FIG. 7 is a sectional view of an assembled junction box and cover incorporating a duplex receptacle and the support clips of the second embodiment of the invention.

FIG. 7 shows two of the clips 40 in supporting position of the receptacle mounting brackets 28 and 29 of a receptacle 22. As illustrated, the walls 32 of cover 30 extend into slots 48 of clips 40, and act to secure the clips in position with the crimping action on extension 46 between box 18 and cover 30. As with the first embodiment of the invention, the horizontal legs 44 of clips 40 bear against and support receptacle mounting brackets 28.

Figure 8A:
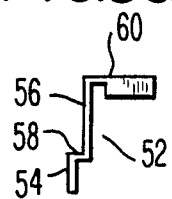
FIGS. 8a, 8b, and 8c are side elevation, front elevation and top plan views, respectively, of a third support clip of a third embodiment of the present invention.
Figure 8B:
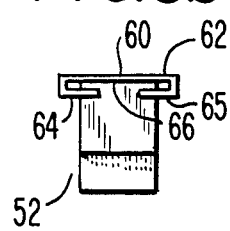
Figure 8C:
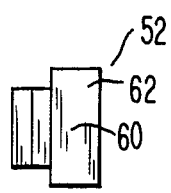

Turning now to FIGS. 8a–8c, there is illustrated yet another support clip 52 of a third embodiment of the present invention. Clip 52 is of a generally stepped configuration and includes a first vertical leg 54 having a lower end and an upper end, a second vertical leg 56 having a lower end and an upper end, a short horizontal section 58 extending between the upper end of leg 54 and the lower end of leg 56, and a horizontal leg 60 having a first end extending from the upper end of leg 56, and a second end. Leg 60 includes a widened section 62 at the second end thereof, and extending downwardly from the sides of this widened section are two generally "L" shaped flanges 64 and 65. As illustrated in FIG. 8b, flanges 64 and 65 face each other and cooperate with section 62 to form a partially opened slot 66 at the upper end of clip 52. The purpose of this slot is to receive the mounting brackets 28 of the receptacle 22. First vertical leg 54 and short horizontal section 58 form a generally inverted "L" shaped flange for engaging the edge of a wall of a junction box.

Figure 9:
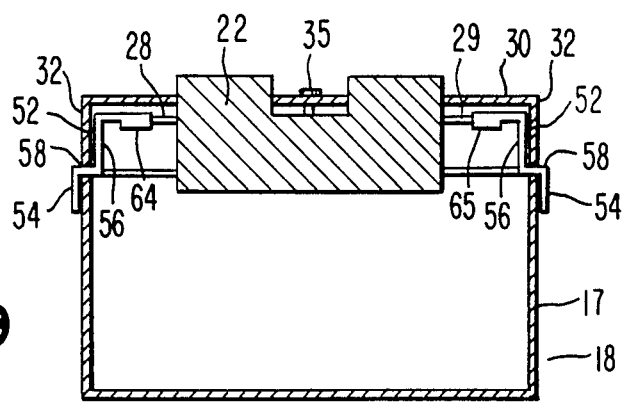
FIG. 9 is a sectional view of an assembled junction box and cover incorporating a duplex receptacle and the support clips of the third embodiment of the invention.

The use of clip 52 to aid in supporting a receptacle in a junction box is illustrated in FIG. 9. As in FIGS. 5 and 7, there is shown a receptacle 22 mounted to junction box cover 30 with a single screw 35. Before the receptacle is actually mounted to the cover, however, the upper ends of clips 52 are attached to the receptacle mounting brackets 28 by inserting the brackets into the slots 66. The receptacle with the clips secured thereon is then mounted to cover 30 with screw 35, and the cover is positioned on and secured to the box 18. As shown, the short horizontal sections 58 of clips 52 abut the top edges of the box walls and are crimped between the mating surfaces of box 18 and the cover 30, while the first vertical legs 54 extend along the outside of the box walls 17. In this manner as with the other embodiments of the present invention, when the cover is secured to the box, the clips 52 serve to support the receptacle mounting brackets 28, and thereby prevent the pivoting of the receptacle 22 about the mounting screw 32 during insertion of a plug into one of the receptacle's outlets, and the subsequent loosening of the mounting screw after repeated usage of the receptacle.

Although the invention has been illustrated in terms of preferred embodiments, it will be understood that numerous variations and modifications can be made by those of skill in the art without departing from the true spirit and scope of the inventive concepts as set forth in the following claims. For example, the specific shape and construction of the clips utilized in the disclosed embodiments are shown just by way of example and could be varied or altered if desired without altering their essential function or operation. In addition, if it is desirable to more securely mount the support clips, any suitable device could be utilized such as an adhesive, spot welding or the use of spring metal in the clips.

What is claimed is:

1. Apparatus for supporting an electrical fixture in a junction box, comprising:
   an electrical fixture having a first end and a second end, a top portion, a first mounting bracket at said first end and a second mounting bracket at said second end, and an aperture in the center of said top for reception of a mounting screw;
   a junction box having four walls;
   a junction box cover having at least a top and at least one aperture in said top for reception of a mounting screw, whereby said electrical fixture may be mounted to said cover solely with a mounting screw through said aperture in said top of said cover and said aperture in said top of said fixture, and whereby said first and second mounting brackets are unsecured to the junction box cover;

means for secure said junction box cover to said junction box;

at least a first clip including:

a lower end having means to secure the clip to the junction box; and an upper end having means to support and engage one of said unsecured fixture mounting brackets, whereby said clip supports said one of said unsecured fixture mounting brackets when said junction box cover is secured to said junction box.

2. The apparatus of claim 1, wherein at least two of said clips are provided, a first clip for supporting said first mounting bracket, and a second clip for supporting said second mounting bracket.

3. The apparatus of claim 2, wherein said electrical fixture is a duplex receptacle.

4. The apparatus of claim 2, wherein said means to secure the clips comprises a "U" shaped flange at the lower end of each of said clips engaging an edge of one of said junction box walls.

5. The apparatus of claim 2, wherein said cover further includes four walls; and wherein said means to secure said clips comprises a "U" shaped flange at the lower end of said clips which engages an edge of one of said cover walls.

6. The apparatus of claim 2, wherein said means to secure the clips comprises an inverted "L" shaped flange at the lower end of the clips which is adapted to be crimped between the mating surfaces of the junction box walls and the cover.

7. The apparatus of claim 2, wherein said means to support and engage said fixture brackets comprises a horizontal leg at the upper end of each said clips which is adapted to engage and support the bottom surface of one of said mounting brackets.

8. The apparatus of claim 2, wherein said means to support and engage said fixture brackets comprises, for each clip:

a horizontal leg at the upper end of said clip; and a pair of generally "L" shaped flanges which face each other and extend downwardly from the sides of said horizontal leg, and cooperate with said horizontal leg to form a partially opened slot for receiving one of said fixture mounting brackets, to thereby engage and support the same.

9. The apparatus of claim 2, wherein each said clips is formed from a single piece of sheet material.

10. The apparatus of claim 9, wherein said material is metal.

11. Apparatus for supporting the ends of an electrical fixture in an electrical junction box comprising:

at least two generally inverted "L" shaped clips each having a first end and a second end and including:

a vertical leg having a lower end and an upper end;

a horizontal leg extending from said upper end of said vertical leg; and an "L" shaped extension extending from said lower end of said vertical leg and together with said vertical leg forming a "U" shaped flange for engaging the wall portion of a junction box cover;

wherein each said clip may be secured in a crimped manner between the mating surfaces of a junction box and a junction box cover when the cover is secured to the junction box; and wherein said horizontal leg of each said clip may engage and support the bottom surface of a mounting bracket disposed on an end of an electrical fixture when the electrical fixture is secured to a junction box cover.

12. Apparatus for supporting the ends of an electrical fixture in an electrical junction box comprising:

at least two generally step shaped clips each having a first end and a second end and including:

a first vertical leg having a lower end and an upper end;

a second vertical leg having a lower end and an upper end;

a short horizontal section extending between the upper end of said first vertical leg and the lower end of said second vertical leg;

a horizontal leg extending from the upper end of said second vertical leg; and two generally "L" shaped flanges which extend downwardly from the sides of said horizontal leg, and cooperate with said horizontal leg to form a partially opened slot;

said short horizontal section being disposed to be crimped between the mating surfaces of a junction box and a junction box cover when the cover is secured to the box; and said partially opened slot being disposed to receive a mounting bracket on an end of an electrical fixture, whereby said clips serve to engage and support the mounting brackets of an electrical fixture when the fixture is secured to a junction box cover and the cover is secured to a junction box.

* * * * *

UNITED STATES PATENT AND TRADEMARK OFFICE
CERTIFICATE OF CORRECTION

PATENT NO. : 4,679,882

DATED : July 14, 1987

INVENTOR(S) : Mears

It is certified that error appears in the above-identified patent and that said Letters Patent is hereby corrected as shown below:

Claim 1, column 5, line 5, "for" should be --to--.

Signed and Sealed this

Sixth Day of October, 1987

Attest:

DONALD J. QUIGG

Attesting Officer

Commissioner of Patents and Trademarks